US009386386B2

(12) United States Patent
Risberg et al.

(10) Patent No.: US 9,386,386 B2
(45) Date of Patent: Jul. 5, 2016

(54) SYSTEM AND METHOD FOR AUDIO ENHANCEMENT OF A CONSUMER ELECTRONICS DEVICE

(71) Applicant: Actiwave AB, Solna (SE)

(72) Inventors: Pär Gunnars Risberg, Solna (SE); Richard Kjerstadius, Stockholm (SE); Landy Toth, Newtown, PA (US)

(73) Assignee: Actiwave AB, Solna (SE)

( * ) Notice: Subject to any disclaimer, the term of this patent is extended or adjusted under 35 U.S.C. 154(b) by 12 days.

(21) Appl. No.: 14/370,994

(22) PCT Filed: Jan. 9, 2013

(86) PCT No.: PCT/US2013/020734
§ 371 (c)(1),
(2) Date: Jul. 8, 2014

(87) PCT Pub. No.: WO2013/106366
PCT Pub. Date: Jul. 18, 2013

(65) Prior Publication Data
US 2015/0030165 A1    Jan. 29, 2015

Related U.S. Application Data

(60) Provisional application No. 61/584,462, filed on Jan. 9, 2012.

(51) Int. Cl.
*H04R 29/00* (2006.01)
*H04R 5/04* (2006.01)

(52) U.S. Cl.
CPC ............... *H04R 29/00* (2013.01); *H04R 5/04* (2013.01); *H04R 29/001* (2013.01); *H04R 2499/11* (2013.01)

(58) Field of Classification Search
CPC .... H04R 29/00; H04R 29/001; H04R 29/004; H04R 27/00; H05K 999/99; G10L 21/00; G01D 7/12; G01S 7/352; G01V 1/32
USPC .............. 381/56, 58; 704/225, 254, 222, 500; 700/94; 715/753
See application file for complete search history.

(56) References Cited

U.S. PATENT DOCUMENTS

2009/0018825 A1* 1/2009 Bruhn ................... G10L 25/69
704/222
2009/0180632 A1 7/2009 Goldberg et al.
(Continued)

FOREIGN PATENT DOCUMENTS

JP 2006-033602 A 2/2006
RU 2064559 C1 * 7/1996

OTHER PUBLICATIONS

International Search report issued in corresponding application No. PCT/US2013/020734 mail Apr. 30, 2013.
(Continued)

*Primary Examiner* — Md S Elahee
(74) *Attorney, Agent, or Firm* — Carter, DeLuca, Farrell & Schmidt, LLP

(57) ABSTRACT

Systems and methods for enhancing the audio experience on a consumer electronic device are disclosed. More particularly systems and methods for optimizing the audio performance of individual consumer electronic devices as part of a manufacturing process and/or retail experience are disclosed. A system for enhancing the audio performance of a consumer electronic device including a parametrically configurable processing block is disclosed.

16 Claims, 5 Drawing Sheets

(56) References Cited

U.S. PATENT DOCUMENTS

| | | |
|---|---|---|
| 2009/0279707 A1 | 11/2009 | Swartz |
| 2010/0272270 A1 | 10/2010 | Chaikin et al. |
| 2011/0013779 A1 | 1/2011 | Arthur |
| 2011/0029111 A1 | 2/2011 | Sabin et al. |
| 2011/0191103 A1* | 8/2011 | Shin ............................... 704/225 |
| 2011/0222696 A1* | 9/2011 | Balachandran ...... H04R 29/001 381/58 |
| 2012/0002823 A1 | 1/2012 | Kanishima et al. |
| 2012/0173240 A1* | 7/2012 | Povey .................. G10L 15/065 704/254 |
| 2013/0096926 A1* | 4/2013 | Maling, III ........... H04L 12/282 704/500 |
| 2013/0174058 A1* | 7/2013 | Kaul ..................... G06F 3/0481 715/753 |

OTHER PUBLICATIONS

Supplementary European Search report issued in corresponding application No. EP 13 73 6388.3 on May 27, 2015.

Klippel, "Active Compensation of Transducer Nonlinearities", XP040374476, AES 23rd International Conference, Copenhagen, Denmark, May 23-25, 2003, pp. 1-17.

\* cited by examiner

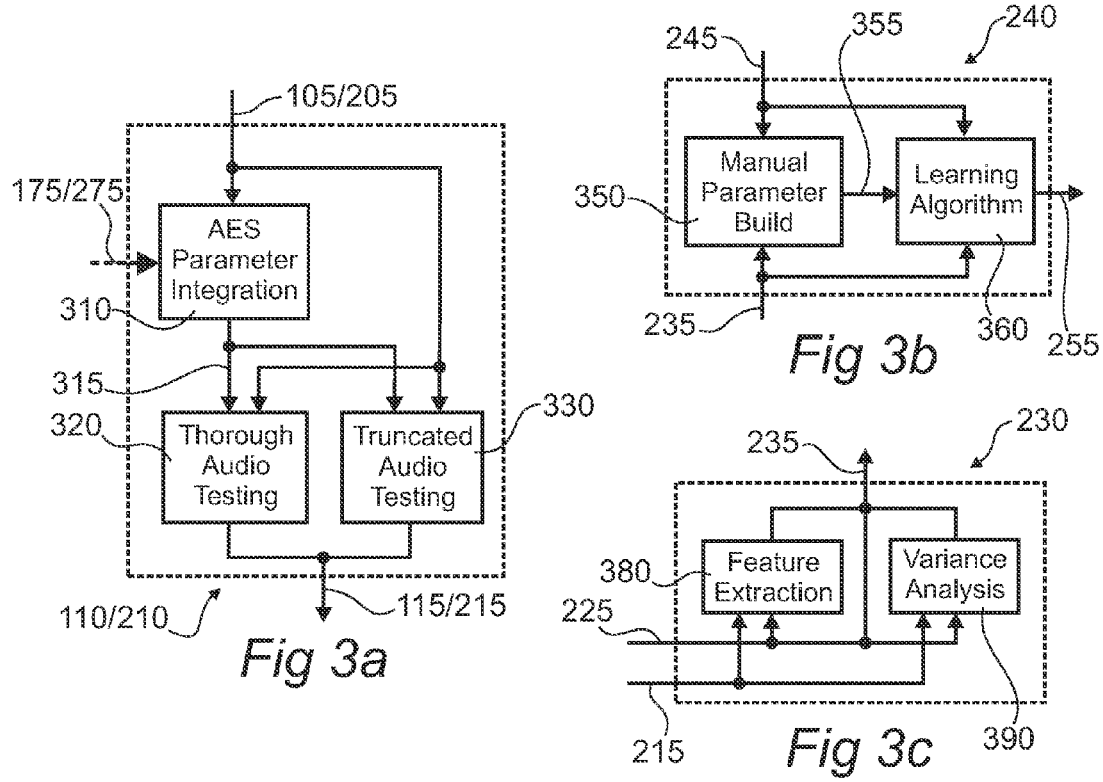
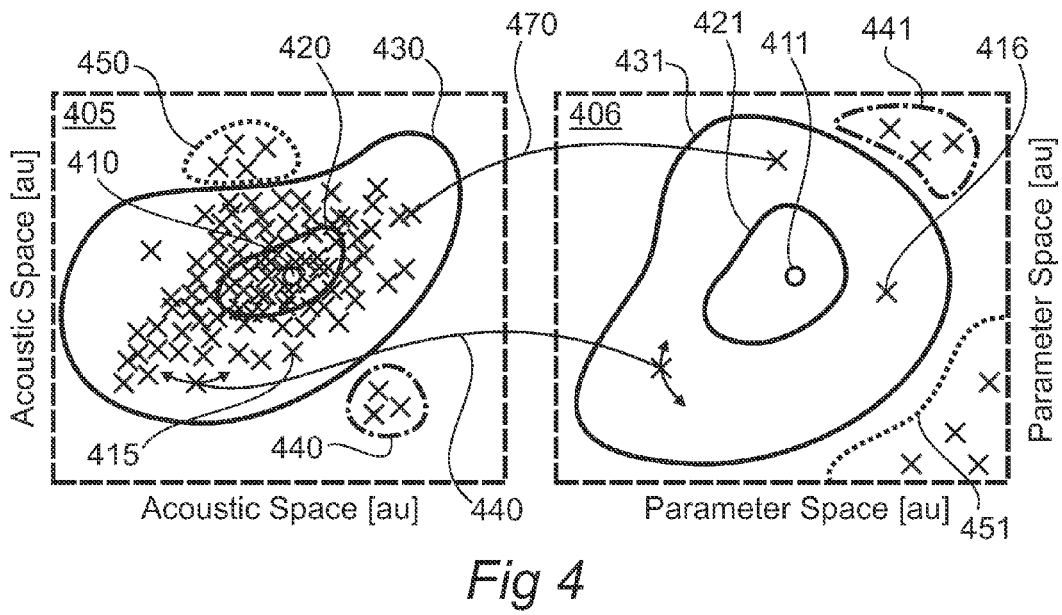
Fig 4

SYSTEM AND METHOD FOR AUDIO ENHANCEMENT OF A CONSUMER ELECTRONICS DEVICE

CROSS-REFERENCE TO RELATED APPLICATION

The present application is a U.S. National Stage Application claiming the benefit of and priority to PCT International Application No. PCT/US2013/020734 filed Jan. 9, 2013, which claims benefit of and priority to U.S. Provisional Application Ser. No. 61/584,462 filed on Jan. 9, 2012, entitled "System and Method for Audio Enhancement of a Consumer Electronics Device", by Pär Gunnars Risberg et al., the entire contents of each of which are incorporated by reference herein for all purposes.

BACKGROUND

1. Technical Field

The present disclosure is directed to systems and methods for improving audio output from consumer electronics devices. More precisely, the present disclosure is directed towards systems and methods for optimizing audio performance of a consumer electronics device as part of a design and/or manufacturing process.

2. Background

Mobile technologies and consumer electronics devices (CED) continue to expand in use and scope throughout the world. In parallel with continued proliferation, there is rapid technical advance of device hardware and components, leading to increased computing capability and incorporation of new peripherals onboard a device along with reductions in device size, power consumption, etc.

Audio experience is one of many factors considered in the design of consumer electronics devices. Often, the quality of audio systems, loudspeakers, etc. are compromised in favor of other design factors such as cost, visual appeal, form factor, screen real-estate, case material selection, hardware layout, and assembly considerations amongst others.

Audio subassemblies and components, including loudspeakers, connectors, filters, gaskets, waveguides, mounting hardware, and/or drivers are generally fabricated and tested to specification by one or more component suppliers and then assembled into consumer electronics devices by a device assembly manufacturer. As such, by the nature of this business practice, the audio subassemblies include aspects such as self-contained speaker enclosures that may add unnecessary material and size to the components. Simultaneously, the design of such audio subassemblies may be highly compromised due to the size and space limitations allotted for the subassembly within a consumer electronics device.

In addition, part to part manufacturing variations as well as production changes (e.g. in terms of component changes, device revisions, process changes, etc.) may all have a significant, often negative, impact on the audio performance of the consumer electronics device. Thus a consumer may receive a device with degraded performance. Alternatively, manufacturing delays and/or reruns may be necessary to correct for the degraded device performance before the device is launched and/or shipped.

The audio performance of a consumer electronics device may be further impacted, often negatively, by the attachment of one or more accessories thereto (e.g. a soft or hard holding case, a scratch resistant cover sheet, a mounting unit, a stand, etc.). Such changes in the audio performance of the device may limit the usage cases available to a consumer and/or decrease the consumer experience related thereto.

SUMMARY

One objective of this disclosure is to provide a system and a method for enhancing audio performance of a consumer electronics device during the design and/or manufacturing thereof.

Another objective is to provide a system and method for tuning the audio performance of a consumer electronics device during the manufacturing thereof, at the point of sale, and/or after attachment of an accessory thereto.

Yet another objective is to provide a consumer electronics device with enhanced audio performance derived from audio components of reduced size, cost and/or complexity.

Another objective is to provide a manufacturing method and system for semi- and/or fully automatic reduction of part to part variation and/or optimization of the audio performance of a consumer electronics device.

The above objectives are wholly or partially met by devices, systems, and methods according to the appended claims in accordance with the present disclosure. Features and aspects are set forth in the appended claims, in the following description, and in the annexed drawings in accordance with the present disclosure.

According to a first aspect there is provided, a system (e.g. an optimization system) for optimizing the audio performance of a consumer electronics device including an audio testing component for deriving an audio test dataset from the consumer electronics device, a master design record for outputting a reference dataset, an audio parameter generator for deriving one or more optimal audio parameters from the audio test dataset and the reference dataset, and a programming unit to program the optimal audio parameters onto the consumer electronics device.

In aspects, the system may include a probabilistic model for determining the optimal audio parameters. Some non-limiting examples of suitable probabilistic models include a Kalman filter, a Markov model, a neural network, a Bayesian network, a fuzzy network, a self-organizing map, a dynamic Bayesian network, combinations thereof, and the like.

In aspects, the system may include a machine learning algorithm for training the probabilistic model.

The master design record may be provided in accordance with the present disclosure. In aspects, the master design record may include at least a portion of a history of audio test datasets and associated optimal audio parameters.

In aspects, the system may include an acoustic analysis unit for generating a relative dataset from the reference dataset and the audio test dataset. The audio parameter generator may be configured to accept the relative dataset for use in generating the optimal audio parameters.

In aspects, the acoustic analysis unit may include a feature extraction block and/or a variance analysis block. The feature extraction block may be configured to derive one or more audio features from the audio test dataset and/or the reference dataset, the audio features included in the relative dataset. The variance analysis block may be configured to derive an audio variance dataset from the audio test dataset and the reference dataset, the audio variance dataset included in the relative dataset.

In aspects, the system may include a manual parameter building interface comprising a display and a data input device for interfacing with a human user.

According to another aspect there is provided, a tuning rig for optimizing the acoustic performance of a consumer electronics device configured to accept one or more programmable audio parameters including an acoustic test chamber configured to accept the consumer electronics device, one or more microphones placed within the acoustic test chamber, and a workstation. The workstation may be configured in operable communication with the consumer electronics device and the microphones, to deliver one or more audio test signals to the consumer electronics device, receive one or more measured signals from the microphones and/or the consumer electronics device, and/or to program at least a portion of the audio parameters.

In aspects, the workstation may include and/or be configured to communicate with a master design record in accordance with the present disclosure. The master design record may be configured to output a reference dataset. At least a portion of the audio parameters may depend upon the reference dataset.

The workstation may be configured to communicate with a cloud based data center. The workstation may communicate such information as the audio test signals, one or more measured signals, audio enhancement parameters, and/or identification information pertaining to the consumer electronics device to and or receive such information from a cloud based data center. In aspects, the master design record may be included the cloud based data center, within a remote computing service network, or the like.

In aspects, the workstation may include software for calculating one or more substantially optimal audio parameters from the audio test signals and the measured signals, and for programming the optimal audio parameters onto the consumer electronics device.

In aspects, the acoustic test chamber may be an anechoic chamber or semi-anechoic chamber.

In aspects, the tuning rig may include a system (e.g. an optimization system) in accordance with the present disclosure.

According to yet another aspect there is provided, use of a tuning rig in accordance with the present disclosure in a manufacturing process.

According to another aspect there is provided, use of a tuning rig in accordance with the present disclosure in a retail store, a device repair setting, a case distributor, or the like.

According to yet another aspect there is provided, a method for enhancing the audio performance of a consumer electronics device including, measuring at least a portion of an acoustic signature of the consumer electronics device, comparing the portion of the acoustic signature of the consumer electronics device to a master design record to produce one or more reconfigured compensation parameters, and programming the reconfigured compensation parameters onto the consumer electronics device.

The method may include placing the consumer electronics device into an audio test chamber, programming a system code along with the reconfigured compensation parameters onto the consumer electronics device, and/or deriving a device profile from the consumer electronics device.

The method may include sending the acoustic signature, the device profile, and/or the reconfigured compensation parameters to a cloud based data center and/or obtaining associated information and/or a master design record from the cloud based data center.

According to another aspect there is provided, a method for tuning the audio performance of a consumer electronics device including, forming a master design record for the consumer electronics device comprising a reference audio parameter set and a reference audio test dataset, uploading the reference audio parameter set to the consumer electronics device, performing an audio test on the consumer electronics device to form a test dataset, comparing the test dataset with the reference dataset to form a new target acoustic response, generating a tuned audio parameter set from the reference audio test data and the new target acoustic response, and uploading the tuned audio parameter set to the consumer electronics device.

The step of generating may be completed with a system in accordance with the present disclosure.

The step of performing may be completed with a tuning rig in accordance with the present disclosure.

BRIEF DESCRIPTION OF THE DRAWINGS

FIGS. 3a-c show schematics of aspects of an optimization system in accordance with the present disclosure.

FIG. 4 shows an illustration of an audio performance space and an associated audio parameter space in accordance with the present disclosure.

DETAILED DESCRIPTION

Figure 1:
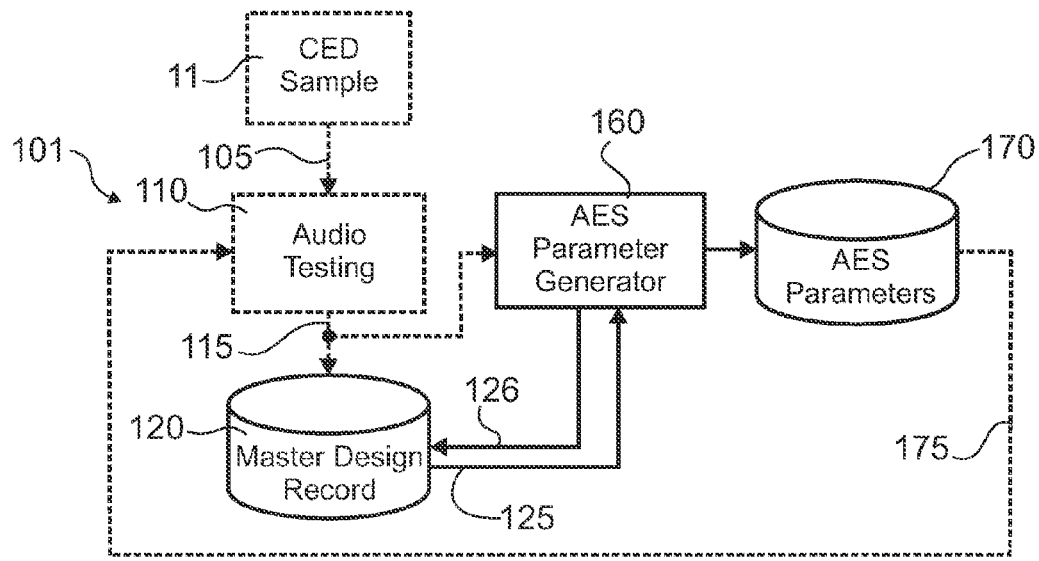
FIG. 1 shows a schematic of an optimization system in accordance with the present disclosure for tuning and/or optimizing one or more audio parameters of a consumer electronics device.

Particular embodiments of the present disclosure are described hereinbelow with reference to the accompanying drawings; however, the disclosed embodiments are merely examples of the disclosure and may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. Like reference numerals may refer to similar or identical elements throughout the description of the figures.

By consumer electronics device (CED) is meant a cellular phone (e.g. a smartphone), a tablet computer, a laptop computer, a portable media player, a television, a portable gaming device, a gaming console, a gaming controller, a remote control, an appliance (e.g. a toaster, a refrigerator, a bread maker, a microwave, a vacuum cleaner, etc.) a power tool (a drill, a blender, etc.), a robot (e.g. an autonomous cleaning robot, a care giving robot, etc.), a toy (e.g. a doll, a figurine, a construction set, a tractor, etc.), a greeting card, a home entertainment system, an active loudspeaker, a soundbar, or the like.

The consumer electronics device (CED) may include an audio enhancement system (AES) in accordance with the present disclosure.

All consumer electronic devices have an inherent acoustic signature as described below. An associated audio enhancement system (AES) may be configured to compensate for this acoustic signature to enhance and/or standardize the audio output from the device. In the case of the consumer electronic device being an appliance or a power tool, the audio enhancement system may be configured to cancel operating noise, augment operating noise, provide alerts to a user, etc. The audio enhancement system may be configured as an all-digital implementation, which may be suitable for lowering system cost, specifically in terms of the processor, but also in terms of using lower cost transducers, reducing power requirements, etc. The audio enhancement system may also be configured to maintain acceptable audio performance in a low cost application when paired with an exceedingly low cost transducer. In the case of a mobile or battery operated consumer electronic device, such as a portable gaming device, the audio enhancement system may be configured to enhance the audio experience for the user while minimizing power usage, thus extending the battery life, reducing onboard heat generation, etc.

By transducer 540, 560 is meant a component or device such as a loudspeaker suitable for producing sound. A transducer 540, 560 may be based on one of many different technologies such as electromagnetic, thermoacoustic, electrostatic, magnetostrictive, ribbon, audio arrays, electroactive materials, exciters, and the like. Transducers 540, 560 based on different technologies may require alternative driver characteristics, matching or filtering circuits but such aspects are not meant to alter the scope of this disclosure.

By transducer module 550 is meant a subsystem including both a transducer 560 and a circuit 555. The circuit 555 may provide additional functionality (e.g. power amplification, energy conversion, filtering, energy storage, etc.) to enable a driver external to the transducer module 550 to drive the transducer 560. Some non-limiting examples of the circuit 555 include a passive filter circuit, an amplifier, a de-multiplexer, a switch array, a serial communication circuit, a parallel communication circuit, a FIFO communication circuit, a charge accumulator circuit, combinations thereof, and the like.

By input audio signal 501 is meant one or more signals (e.g. a digital signal, one or more analog signals, a 5.1 surround sound signal, an audio playback stream, etc.) provided by an audio source (e.g. a processor, an audio streaming device, an audio feedback device, a wireless transceiver, an ADC, an audio decoder circuit, a DSP, etc.).

By acoustic signature is meant the audible or measurable sound characteristics of a consumer electronic device dictated by its design and/or manufacturing processes, process variations, etc. that influence the sound generated by the consumer electronic device. The acoustic signature is influenced by many factors including the loudspeaker design (speaker size, internal speaker elements, material selection, placement, mounting, covers, etc.), device form factor, internal component placement, screen real-estate and material makeup, case material selection, hardware layout, manufacturing process variations, manufacturing component changes, manufacturing process changes, and assembly considerations amongst others. Cost reduction, form factor constraints, visual appeal and many other competing factors may be favored during the design process at the expense of the audio quality of the consumer electronic device. Thus the acoustic signature of the device may deviate significantly from an idealized response (e.g. a target acoustic response).

Manufacturing variations in the above aspects may significantly influence the acoustic signature of each device, causing further part to part variations that may degrade the audio experience for a user. Some non-limiting examples of factors that may affect the acoustic signature of a consumer electronic device include: insufficient speaker size, which may limit movement of air necessary to re-create low frequencies, insufficient space for the acoustic enclosure behind the membrane which may lead to a higher natural roll-off frequency in the low end of the audio spectrum, insufficient amplifier power available, an indirect audio path between membrane and listener due to speaker placement often being on the back of a TV or under a laptop, relying on reflection to reach the listener, among others factors.

In aspects, the acoustic aspects of the loudspeaker 540, 560 may be significantly altered and influenced by the casing of the CED, the portion of the enclosure of the CED available as a back volume, the number, placement and/or organization of other components within the CED, the mounting aspects of the loudspeaker, and the like. Many of the acoustic aspects of such systems may not be fully characterize able until the system has been completely assembled. Even seemingly minor process variations may significantly influence the acoustic performance of the CED.

In aspects, the acoustic performance of the CED may be significantly altered by the attachment of an accessory (e.g. a casing, a screen protector, a jacket, a mounting clip, a stand, etc.).

Thus an AES in accordance with the present disclosure may be optimized late in the design process, during the development process, in the field, at a retail outlet, and/or during a manufacturing process to compensate for one or more of these, generally negative, influences on the acoustic properties in the fully manufactured device.

In aspects, the AES may be configured initially during the design stage of the product development, in an audio test facility. Thus an initial set of AES parameters may be assembled and loaded into the AES. During manufacturing of the CED, individual devices, batches, etc. may have differing acoustic properties and anomalies due to manufacturing variances, component changes, material changes, etc. Tuning and/or optimization of the AES included in each device may be used to adjust the audio performance of the device during the manufacturing process. The tuning and/or optimization of the AES, and/or associated parameters related to a particular CED may be performed with an optimization system 101 in accordance with the present disclosure.

FIG. 1 shows a schematic of an optimization system 101 in accordance with the present disclosure for tuning and/or optimizing one or more audio parameters of a consumer electronics device. The optimization system 101 includes an audio testing component 110 configured for gathering acoustic data 105 from a sample CED 11, a master design record 120 configured to store and for providing data 125 to other components of the system 101, and an audio enhancement system (AES) parameter generator 160 configured to produce one or more AES parameters 170 from the provided data 115, 125. The AES parameters 170 may be downloaded to an associated AES 500 in accordance with the present disclosure, to a batch of manufactured CEDs, etc.

In aspects, the AES parameters 170 may be directed 175 to the audio testing component 110 and/or the sample CED 11 for further testing. In this sense, the process of generating a final set of AES parameters 170 for a sample CED 11 may be iteratively implemented within the optimization system 101.

In aspects, the audio testing component 110 may produce audio data 115 for use by the AES parameter generator 160, for contribution and/or comparison to the master design record 120, etc. The audio testing component 110 may be implemented as part of a tuning rig 900 in accordance with the present disclosure. Thus the audio testing component 110 may be implemented in code and/or hardware for carrying out the steps of determining parameters 704, 802 and/or the step of analyzing the CED 714 in accordance with the present disclosure.

The master design record 120 may include acoustic reference datasets, population datasets associated with the product family of the CED 11, master records of audio enhancement parameters, audio performance characteristics, reference datasets, master records associated with audio test datasets (e.g. audio test data input and output information) collected from representative CEDs, etc. The master design record 120 may be configured to output data 125 for use in the system 101 and to accept test data 115, 126 from other blocks in the system 101 for use in building and/or augmenting a dataset. Recorded test data 115, 126 may be validated and stored within the master design record 120 for future reference.

In one non-limiting example, the CED acoustic optimization process may be split into multiple steps. A master design record 120 may be constructed for a particular product line during the product design process. Such a master design record 120 may be constructed using a complete suite of audio testing equipment and analytics, in a highly controlled and state of the art testing facility. Such a process, optionally to a lesser degree of precision, may also be performed on sample batches and/or individual devices during the product design and production ramp-up phases of a product line in order to generate statistical models relating to the master design record 120 that are characteristic of the CED for the product line. Such models may be advantageous for determining the relationship between process variations and associated variations in the audio performance of each manufactured device. Any portion of this data, relevant to the product line may be stored within and made available by a master design record in accordance with the present disclosure.

The master design record 120 may be further developed during the design and manufacturing of a CED so as to improve product yield, reduce part to part variation, ensure optimal audio performance, etc. as process and product changes associated with the manufacture of the CED change.

The AES parameter generator 160 may implement one or more methods for calculating a set of AES parameters from test data 115 and/or data 125 from the master design record 120. The AES parameter generator 160 may implement the formulation methods 706, 716 and/or the optimization method 804 in accordance with the present disclosure.

By optimizing the AES for batches of devices and sample devices during the design and manufacturing ramp-up phases of a consumer electronics device (CED), a design space for the AES parameters as they relate to process variations may be formulated. Thus the relationship between optimal AES parameter variations and audio performance variants due to variations in manufacturing processes may be semi-automatically compensated for during the manufacturing ramp-up and full manufacturing of the product line. Early established relationships, as well as validated changes in such relationships (perhaps as occur during refinement of a manufacturing process, etc.), may be integrated into the master design record 120 and provided as data 125 during the parameter generation process.

In one non-limiting example, a master design record in accordance with the present disclosure may be used to tune the audio performance of a consumer electronics device. The master design record may include a reference audio parameter set and a reference audio test dataset. The reference audio parameter set may be an optimal parameter set obtained from a reference design of the consumer electronics device, perhaps during the design process of the device, during the ramp-up phase of the development, from a manufactured batch of devices, etc. The reference audio parameter set may pertain to an audio parameter set that best matches the acoustic response of the reference design, when subjected to a series of audio tests, to a target and/or ideal acoustic response.

The reference audio parameter set may be uploaded to the consumer electronics device and the consumer electronics device may then be subjected to a series of audio tests to form a test dataset. The test dataset may then be compared with the reference dataset, the difference between the data sets being used to form a new target acoustic response. The new target acoustic response may then be used in conjunction with the reference audio test data to generate a tuned audio parameter set. The tuned audio parameter dataset may then be uploaded to the consumer electronics device. One or more steps in this process may be achieved using an optimization system 101, 201 and/or a tuning rig 900 both in accordance with the present disclosure.

The target acoustic response may be a Dirac delta function, a realistically achievable approximation of a Dirac delta function, a predetermined frequency response, an output associated with an audio data stream (e.g. a song, a chirp, etc.), or the like.

The new target acoustic response, may take on a form that is considerably similar to the target acoustic response, but may vary from that response in terms of frequency dependent aspects, features, etc. In one non-limiting example, the optimization system 101, 201 may determine the differences (e.g. variance within each octave band, differences between integration of impulse responses, etc.) between the new target acoustic response and the target acoustic response to form an audio variance dataset. If the magnitude of key parameters within the variance dataset are within an acceptable margin (e.g. ±1 dB within each octave band variance) the optimization system 101, 201 may opt not to update the audio parameter set, if the variance dataset is outside of the margin, the optimization system 101, 201 may opt to derive a tuned audio parameter set for upload to the consumer electronics device.

Figure 2:
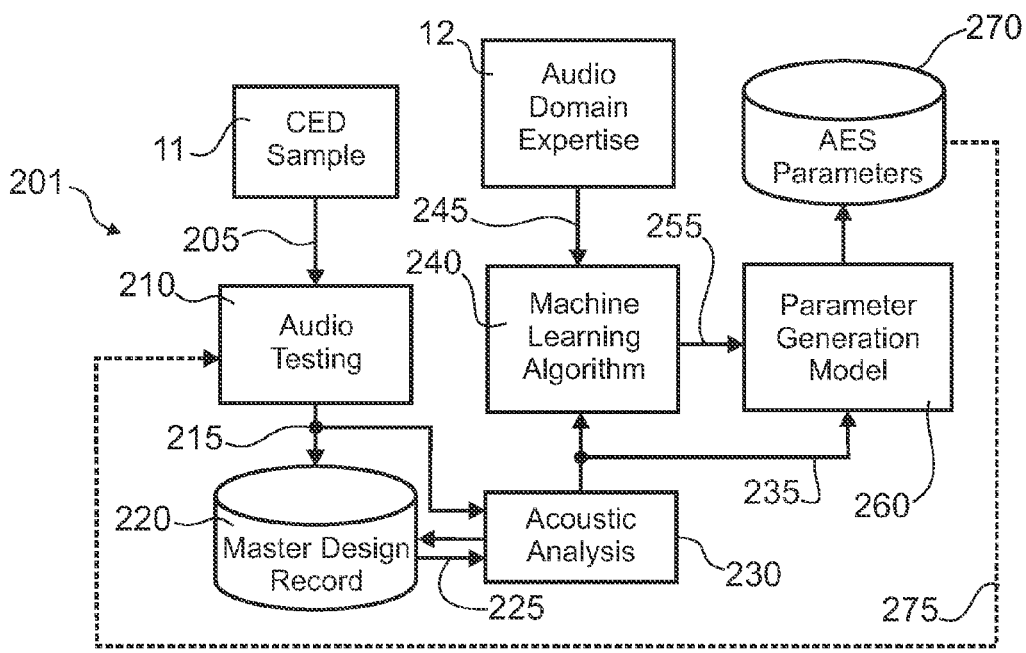
FIG. 2 shows a schematic of an optimization system in accordance with the present disclosure for tuning and/or optimizing one or more audio parameters of a consumer electronics device.

FIG. 2 shows a schematic of an adaptive optimization system 201 configured to tune and/or optimize one or more audio parameters of a consumer electronics device 10, 11, 610. The adaptive optimization system 201 includes an audio testing component 210, a master design record 220, a parameter generation model 260, and a machine learning algorithm 240, configured to train the parameter generation model 260. The system 201 may include an acoustic analysis unit 230 configured to provide features, differences, data 225, and/or metrics (e.g. collectively referred to as relative data 235) derived via comparison between data 225 from the master design record 220 and the test data 215 to other aspects of the adaptive optimization system 201.

The parameter generation model 260 may be configured to accept relative data 235 as well as influence 255 from the machine learning algorithm 240 to produce the AES parameters 270. Optionally, the substantially optimal AES parameters 270 may be arrived at iteratively. In aspects, the AES parameters 270 may be directed 275 to the audio testing component 210 for further use during each iteration of the testing procedure.

The parameter generation model 260 may be implemented via a deterministic, probabilistic and/or combination model. A probabilistic model may be used to link AES parameters and parameter variations due to changes in the audio performance of the batch samples, further elucidating and establishing design relationships between product performance variance and AES parameters. Some suitable models may include Kalman filters, Markov models, back propagation artificial neural networks, Bayesian networks, basis functions, support vector machines, stochastic modeling methods (e.g. Monty Carlo methods, multilevel models, hierarchical models, nested models, mixed models, random coefficient, random-effects models, random parameter models, etc.), Gaussian process regression, information fuzzy networks, regression analysis, self-organizing maps, logistic regression, time series models such as autoregression models, dynamic Bayesian networks, moving average models, autoregressive integrated moving average models, classification and regression trees, multivariate adaptive regression splines, combinations thereof, and the like.

The machine learning algorithm 240 may be configured to accept user input 245 from a human expert 12. The human expert 12 may provide manual training assistance and acoustic performance/AES parameter match confirmations early in the development of the CED. Such input may be used to develop an automatic or semi-automatic learning algorithm for calculating future incidences of acoustic parameters (e.g. AES parameters). Some non-limiting examples of learning algorithms include non-linear least squares, L2 norm, averaged one-dependence estimators (AODE), case-based reasoning, decision trees, regression analysis, self-organizing maps, logistic regression, and the like.

The human expert 12 may help to train the adaptive system 201. Alternatively, additionally, or in combination the human expert 12 may execute manual parameter builds and tests so as to build the overall structure of the parameter generation model 260 and/or master design record 220 before handing control over to the machine learning algorithm 240 for more automated testing and optimization of AES parameters 270.

The optimization system 101, 201 may be implemented in a workstation 960 or equivalently in a cloud data center. The optimization system 101, 201 may include algorithms to compare audio performance histories of manufactured CEDs 10 and trends in the datasets (e.g. as provided by the master design record 120, 220) suitable to predict the performance criteria for the present batch of manufactured consumer electronics devices based on the testing and optimization results of a tested CED 10. Such a configuration may be advantageous for economically optimizing the audio performance of a batch of consumer electronics devices during the manufacturing process without having to test and optimize every unit that is manufactured. In one non-limiting example, such functionality may be provided by an optimization system 101, 201 and/or with a tuning rig 900 in accordance with the present disclosure.

In one non-limiting example, the audio enhancement parameters 170, 270 for the CED 10 may be saved within the cloud in the form of a device profile. The device profile may contain identification information, manufacturing tracking information, acoustic performance data, usage data, audio enhancement parameters, tuned AES parameters, and/or the like, such information being a unique identifier of the consumer electronics device. In one non-limiting usage example, an audio streaming service may use the device profile to pre-process an audio stream before sending the audio stream to the CED 10. Such a configuration may be advantageous for improving audio output from the CED 10 while simultaneously minimizing the power consumed on the CED 10 during use.

FIGS. 3a-c show schematics of aspects of an optimization system 101, 201 in accordance with the present disclosure. FIG. 3a shows an audio test unit 110, 210 including optionally an AES parameter integration block 310, a thorough audio testing suite 320, and a truncated audio testing suite 330. The audio test unit 110, 210 may be configured to accept audio data 105, 205 from a sample CED 11. The AES parameter integration block 310 may be configured to simulate and/or to download AES parameters 175, 275 to the CED 11 such that the AES affected output 315 can be generated and provided to other units in the optimization system 101, 201 via implementation of one or more test procedures. With or without the AES parameter integration block 310, the thorough audio testing suite 320 may include a range of tests to perform on the CED to extract the necessary audio information from the CED 11 for use in determining a substantially optimal set of AES parameters 175,275 for use on the CED 11 (i.e. optimized so as to enhance the audio output capability of the associated consumer electronics device 11). A thorough audio test suite may include a range of audio tests (e.g. impulse signals, frequency sweeps, music clips, pseudo-random data streams, etc.). In addition, the tests may be performed with sufficient detail (e.g. with higher precision, more accurate inputs, etc.) as well as with higher tech equipment during implementation of the thorough test suite 320. Alternatively, the truncated audio test suite may perform only a subset of tests (e.g. a music clip, a frequency sweep etc.), optionally with less scope and/or precision (i.e. so as to reduce test times, to characterize key features in the acoustic response, etc.). In aspects, the test datasets 115, 215 may be made available to other components in the optimization system 101, 201

In aspects, a thorough test suite 320 may be implemented during the design and manufacturing ramp-up of a CED, optionally in order to build at least a portion of a master design record, to train a learning algorithm, to tune a parameter generation model, or the like.

In aspects, a truncated test suite 330 may be implemented during manufacturing, at the point of sale, etc. in order to determine various acoustic aspects (e.g. a resonant peak, a resonant frequency, a bass response, a phase delay, a defect, etc.) for use in the tuning of an AES parameter set for use with the CED.

Differences between the thorough test suite 320 and the truncated test suite 330 may be characterized and stored so as to compensate for these differences during an optimization process on an individual device. One non-limiting method for characterizing the differences may be to perform the test suites 320, 330 on the same reference consumer electronics device, and/or in a high quality anechoic chamber, versus a lower quality acoustic test chamber, etc.

FIG. 3b shows a schematic of a machine learning algorithm 240 including a learning algorithm 360 and optionally a manual parameter building interface 350. The learning algorithm 360 may be configured to provide an influence 255 in order to build, adapt and/or tune the parameter generation model automatically, semi-automatically and/or with expert assistance. The manual parameter building interface 350 may be configured to provide a training signal 355 to the learning algorithm 360. The training signal 355 may be dependent on expert input 245, the relative data 235, etc.

The parameter building interface 350 may be configured to accept data 125, 115, 235 from the master design record 120, 220, the audio testing unit 110, 210, and/or the acoustic analysis unit 230 as well as to accept inputs 245 from the audio domain expert 12.

In aspects, the manual parameter building interface 350 may be used to build and/or validate relationships between audio performance data and the AES parameters in the form of models within the parameter generation model 260 through, optionally interfacing with an audio domain expert 12.

FIG. 3c shows a schematic of an optional acoustic analysis unit 230 including a feature extraction block 380 and a variance analysis block 390. The feature extraction block 380 may be used to extract quantitative and/or qualitative acoustic features (e.g. a resonant peak, a resonant frequency, a bass response, a phase delay, a defect, general features, feature set categories, etc.) from test data 115 and master design record data 125. The extracted features, variance, test data, and/or master design record data (collectively referred to as relative data 235) may be provided to the AES generation model 260 and/or the machine learning algorithm 240.

The variance analysis block 390 may be configured to generate metrics relating deviations between the CED audio parameter population, the master design record 220, manufacturing batch properties, or the like with test data 215 related to the sample CED 11 under test.

FIG. 4 shows an illustration of an audio performance space 405 and an associated audio parameter space 406 in accordance with the present disclosure. A two dimensional relationship is shown only so as to highlight the concepts and relationships relevant to the present disclosure. In practice, higher order spaces may be necessary to characterize the audio performance space 405 and associated parameter space 406. The arbitrary axes shown may relate to quantitative aspects of a key acoustic feature (e.g. a resonant peak, a resonant frequency, a bass response cut-off frequency, an integrated frequency response, etc.). Thus a measured instant on the graph (as indicated by an X), may be related to a measured response in terms of a key acoustic feature. Relating to higher order (and thus more practical spaces), all key peaks, etc. may be used as inputs to the model. Alternatively, raw data may be used as a model input against which variance and feature extraction metrics may be measured. The associated audio parameter space 406 may have arbitrary axes relating to acoustic parameters, model response, aspects related to a target acoustic response (e.g. as stored in the master design record), etc.

Qualitative aspects of the acoustic response may be used to further classify the overall behavior of the CED (e.g. so as to direct the model to alternative AES structures, introduce new parameters and/or AES components in response to a detected acoustic feature, etc.).

An audio performance point in the audio performance space 405 may relate to a point in the associated AES parameter space 406 (e.g. point to point relationship 470). Small changes in response about an audio performance point in the audio performance space 405 may be associated with variance of the AES parameters in the associated AES parameter space 406 (e.g. variability relationships 480).

As shown an ideal design point 410 and associated ideal parameters 411 may be determined during the design of the CED and associated AES. An acceptable parameter variance boundary 420, 421 may be fixed such that any test sample that produces a test point (designated X) within the acceptable boundary 420, 421, may perform adequately with the ideal parameters 411 (i.e., thus no AES updates may be necessary).

An automatically recoverable boundary 430, 431 may be defined such that a robust automatic adjustment of the AES parameters may be ensured if the test point (e.g. test point 415, 416) is provided within this boundary 430, 431. Such automatic adjustment may be provided by an optimization system 101, 201 in accordance with the present disclosure.

There may also be manually recoverable regions 440, 441 in the audio performance space 405, wherein an expert manual optimization and/or thorough testing regiment may be required in order to suitably adjust the AES parameters for the sample CED 11. Such manually recoverable regions 440, 441 may appear routinely during the training of the optimization system 101, 201 or during the product development of a CED. As the optimization system 101, 201 is built and the relationships between optimal AES parameters and samples occurring in the manually recoverable regions 440, 441 become established, the automatically recoverable boundary 430, 431 may be expanded to encase those regions (thus no longer requiring deeper intervention in order to tune the associated AES parameters). Such changes may be suitable ways to build and train the optimization system 101, 201 for use with a new CED product family.

There may also be unrecoverable regions 450, 451 (e.g. associated with manufacturing faults, unstable assembly conditions, faulty components, etc.) which may be monitored as part of a quality control system.

As swaths of samples are tested by such an approach, clear relationships between particular test batches of product and the optimal AES configuration may be established. During such testing, the boundaries 410, 411, 420, 421, 430, 431 may grow in both size and robustness. Thus the optimal system 101, 201 may better optimize the AES parameters for a given response as measured from a sample CED 11.

Such robust characterization and relationships may provide a means for detecting measurement errors that may happen in a manufacturing environment. Thus if a sample CED test results in a test point outside of a known boundary 410, 411, 420, 421, 430, 431 the optimization system may retest the sample CED to determine if a measurement error occurred. Such error detection may be advantageous for improving production line robustness of such a process. Qualitative features may be further used to assist in the detection of such measurement and/or device errors.

In aspects, during a training/learning process, as the relationships between process variation and AES model properties become better defined and predictable, fewer and fewer batch samples may need be tested from manufacturing batches in order to calculate and/or select AES parameters for implementation into a particular device or batch of devices.

Furthermore, as the relationships become more clearly defined during manufacturing ramp-up, the breadth and depth of the batch testing may be shortened and simplified considerably so as to only hone in on relevant property variations that constitute alternative AES parameter configurations (i.e. the appearance of a new acoustic feature). Other changes may be automatically compensated for by a trained optimization system 201 in accordance with the present disclosure.

Such an approach may further be used to track manufacturing property drift in the product line. If drift is detected, larger samples maybe drawn from the manufactured lots for a period of time in order to establish new relationships between the recently manufactured products and their associated optimal AES parameters. As the new relationships are better understood, batch sampling may be reduced back to a minimal level.

Criteria for adjusting the AES parameters may also be established during early stage testing of a product line. The criteria may define an acceptable variance between performance of a manufacturing test sample and the master design record beyond which adjustments to the AES parameters may be made.

In aspects, the AES parameters may be broken into a batch sample master parameter set and a subset of parameters that may be tweaked during a rapid manufacturing test (e.g. a subset of biquad filters and/or equalizers that may be used to pull the AES in a particular direction to accommodate manufacturing process variations). The configurable subset of parameters may be established with relation to the known manufacturing variances for a product line, such that the properties of the AES are not overly changed during a revision, and/or to establish measureable ranges in the parameters that may be expected during manufacturing (e.g. to determine if a measurement error occurred during a rapid manufacturing test). Such configurations may be suitable to maintain stable and high quality operation of the devices amid a high degree of manufacturing process variation.

In one non-limiting example, a sample consumer electronics device is tested in accordance with the present disclosure less than every 10,000 units, every 1,000 units, every 100 units, or every 10 units during a production run. If manufacturing variations necessitate changes in an AES parameter set, detailed testing of the samples could be used to establish new optimal parameters for the AES production population.

The audio enhancement system (AES) may be programmed with audio parameters (e.g. pre-configurable and/or reconfigurable parameters, optimal audio parameters, etc.) at the time of acoustic testing, along with programming of the other components in the CED (e.g. during JTAG programming of the CED chipsets, etc.), or the like.

In one non-limiting example, the CED may include a separate audio input/programming port accessible to the test chamber or programmer to deliver the audio test signals and/or final audio parameters to the CED during the manufacturing process.

In aspects, an AES in accordance with the present disclosure may be preprogramed in a test mode, when powered on the AES may run through a series of pre-programmed test procedures, record acoustic feedback from the tests and upload the resulting information to a test system (e.g. a workstation 260, etc.). The AES may then be reprogrammed with the operational code (e.g. including the optimized audio parameters). The reprogramming may occur along with the rest of the CED chipsets, during JTAG testing, immediately after the audio testing, etc.

Figure 5:
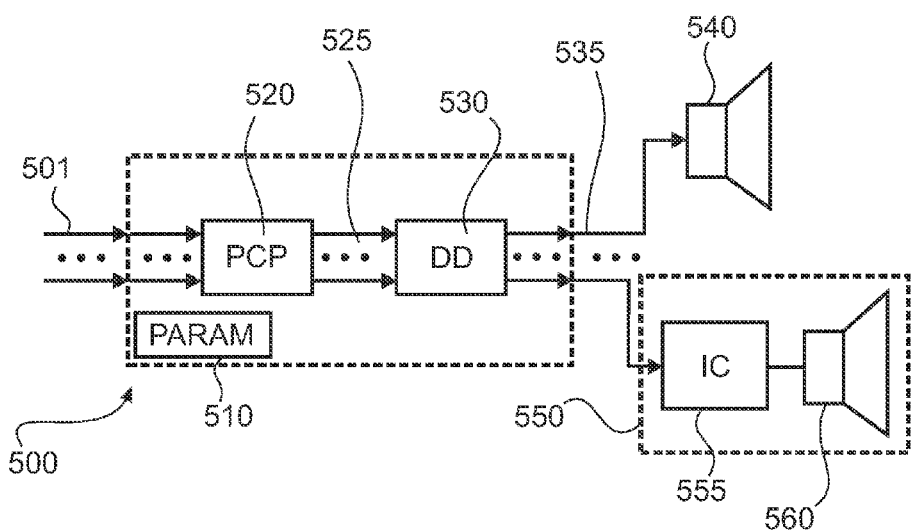
FIG. 5 shows an audio enhancement system in accordance with the present disclosure.

FIG. 5 shows a schematic of an audio enhancement system in accordance with the present disclosure. The audio enhancement system 500 may be configured to accept one or more input audio signals 501 from a source (e.g. a processor, an audio streaming device, an audio feedback device, a wireless transceiver, an ADC, an audio decoder circuit, a DSP, etc.), and to provide one or more output signals 535 to one or more transducers 540 (e.g. a loudspeaker, etc.), or transducer modules 550 (e.g. a transducer 560 combined with associated integrated circuits 555, etc.). The audio enhancement system 500 may include internal blocks (e.g. parametrically configurable processing [PCP] block, digital driver [DD] block, asynchronous sample rate converter [ASRC] block, etc.) which may be configured to transform and/or act upon the input audio signal 501 or signals derived therefrom to produce the output signal(s) 535.

In aspects, the audio enhancement system 500 may be provided in software, embedded in an application specific integrated circuit (ASIC), or be provided as a hardware descriptive language block (e.g. VHDL, Verilog, etc.) for integration into a system on chip integrated circuit (ASIC), a field programmable gate array (FPGA), or a digital signal processor (DSP) integrated circuit. One or more blocks (e.g. PCP block, ASRC block, etc.) may also be implemented in software on the consumer electronics device and/or in an associated network (e.g. a local network server, in the cloud, etc.). In aspects, the AES 500 may be an all-digital hardware implementation. An all-digital implementation may be advantageous to reduce the hardware footprint, reduce power consumption, reduce production costs, and increase the number of integrated circuit processes into which the system may be implemented. The implementation may be integrated into a consumer electronics device in order to provide a complete audio enhancement solution.

As shown in FIG. 5, the audio enhancement system 500 for use in a consumer electronics device may include a parametrically configurable processing (PCP) block 520 and a digital driver (DD) block 530. The audio enhancement system 500 may be configured to accept one or more audio input signals 501 from an audio source. In the schematic shown, the PCP block 520 may be configured to accept the input signal 501 and to produce an enhanced signal 525. The enhanced signal 525 may be directed to the DD block 530 which may be configured to convert the enhanced signal 525 into one or more output signals 535, suitable for driving a transducer 540 (e.g. a loudspeaker, a speaker unit, a loudspeaker assembly, etc.) or a transducer module 550.

The PCP block 520 may be configured to provide such functions as FIR filtering, IIR filtering, warped FIR filtering, transducer artifact removal, disturbance rejection, user specific acoustic enhancements, user safety functions, emotive algorithms, psychoacoustic enhancement, signal shaping, single or multi-band compression, expanders or limiters, watermark superposition, spectral contrast enhancement, spectral widening, frequency masking, quantization noise removal, power supply rejection, crossovers, equalization, amplification, driver range extenders, power optimization, linear or non-linear feedback or feed-forward control systems, and the like. The PCP block 520 may include one or more of the above functions, either independently or in combination. One or more of the included functions may be configured to depend on one or more pre-configurable and/or reconfigurable parameters 510.

The PCP block 520 may be configured to provide echo cancellation, environmental artifact correction, reverb reduction, beam forming, auto calibration, stereo widening, virtual surround sound, virtual center speaker, virtual sub-woofer (by digital bass enhancement techniques), noise suppression, sound effects, or the like. One or more of the included functions may be configured to depend on one or more of the parameters.

The PCP block 520 may be configured to impose ambient sound effects onto an audio signal 501, such as by transforming the audio input signal 501 with an ambient environmental characteristic (e.g. adjusting reverb, echo, etc.) and/or superimposing ambient sound effects onto the audio input signal 501 akin to an environmental setting (e.g. a live event, an outdoor setting, a concert hall, a church, a club, a jungle, a shopping mall, a conference setting, an elevator, a conflict zone, an airplane cockpit, a department store radio network, etc.).

The ambient sound effects may include specific information about a user, such as name, preferences, etc. The ambient sound effects may be used to securely superimpose personalized information (e.g. greetings, product specific information, directions, watermarks, handshakes, etc.) into an audio stream.

The DD block 530 may include a pulse width modulator (PWM). The DD block 530 may be pre-configured and/or pre-selected to drive a range of electroacoustic transducers (e.g. electromagnetic, thermoacoustic, electrostatic, magnetostrictive, ribbon, arrays, electroactive material transducers, etc.). The DD block 530 may be configured to provide a power efficient PWM signal to the transducer 540 or the input of a transducer module 550 (e.g. a passive filter circuit, an amplifier, a de-multiplexer, a switch array, a FIFO communication circuit, a charge accumulator circuit, etc.).

In aspects, one or more block in the AES 500 (or the system itself) may include pre-configurable and/or reconfigurable parameters 510 suitable for configuring the audio processing aspects of the AES 500 (e.g. signal conversion aspects, signal processing aspects, system property compensation, etc.). In aspects, the parameters 510 may be integrated into the AES in general 500, for use by any block 520, 530 within the AES 500. Alternatively or in combination, one or more parameters 510 may be located externally to the AES 500, and the AES 500 may be configured to accept one or more of the external parameters for use by one or more blocks 520, 530 within the AES 500.

The pre-configurable and/or reconfigurable parameters 510 may be pre-configured during the design, manufacturing, validation, and/or testing process of the consumer electronics device 10, 610. Alternatively, additionally, or in combination, the parameters 510 may be pre-configured, tweaked and/or optimized during the manufacturing, quality control, at the time of sale, during first boot, during a boot sequence, and/or during a testing process of the consumer electronics device 10, 610 (e.g. with an optimization system 101, 201 and/or a tuning rig 900 both in accordance with the present disclosure, in an audio test facility, in simulation, etc.). Alternatively, additionally, or in combination, the parameters 510 may be uploaded to the consumer electronics device 10, 610 during a firmware upgrade or through a software updating process, or the like.

In aspects, one or more of the parameters 510 may be dependent on the particular design of the consumer electronics device 10, 11, 610 into which the AES 500 may be integrated and/or to which the AES 500 may be interfaced. In aspects, one or more of the parameters 510 may be dependent on the quality of audio drivers, properties of an associated integrated loudspeaker assembly in accordance with the present disclosure, the back volume formed within the CED 10, component layout, loudspeakers, material and assembly considerations, the casing of the consumer electronics device 10, 11, 610, combinations thereof, or the like, for a specific consumer electronics device, brand of device, or product family of devices (e.g. a laptop product family, a mobile phone series). In aspects, one or more parameters 510 may also depend implicitly on other design factors such as cost, visual appeal, form factor, screen real-estate, case material selection, hardware layout, signal types, communication standards, and assembly considerations amongst others of the consumer electronics device 10, 11, 610.

In aspects, one or more parameters 510 may be incorporated into the audio enhancement system 500 to create an enhanced audio capability on the associated consumer electronics device 10, 610. Alternatively, additionally, or in combination, one or more parameters 510 may be used to optimize the AES 500 essentially being intimately integrated into the AES 500 architecture to provide the enhanced audio experience from the CED 10, 610.

Figure 6A:
FIGS. 6a-b show a consumer electronics device and audio spectral responses obtained therefrom.
Figure 6B:
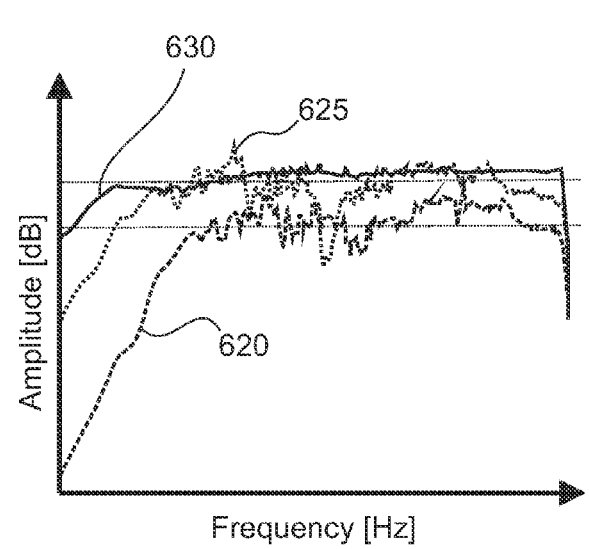

FIGS. 6a-b show a consumer electronics device 610 and audio spectral response obtained therefrom. The consumer electronics device 610 (e.g. a smartphone) may be configured to produce an audio output signal 611. The CED 610 may include an AES 500 in accordance with the present disclosure. The CED 610 may be tested to determine an associated acoustic signature during the design process, the manufacturing process, the validation process, or the like, and the audio performance thereof adjusted through programming of the AES included therein.

In the non-limiting example shown in FIGS. 6a-b, the target acoustic response, in this case being a relatively flat and broad frequency response (e.g. a wide pass band signal). In aspects, the target acoustic response may be used to construct a time equivalent impulse response, which may form the target acoustic response employed in a tuning process with an optimization system 101, 201 in accordance with the present disclosure.

FIG. 6b shows a comparison between a frequency response test of the audio output 611 of the consumer electronics device 610 including a conventional loudspeaker assembly (trace 620), with a highly integrated loudspeaker assembly (trace 625), and with both an integrated loudspeaker assembly and an associated and optimized audio enhancement system in accordance with the present disclosure (trace 630). The figure shows a log-linear frequency response plot with frequency along the horizontal axis and amplitude of the audio output 611 along the vertical axis, in units of decibels.

The trace 630 shows the frequency response of the consumer electronics device 610 with an integrated loudspeaker assembly and an audio enhancement system in accordance with the present disclosure. As seen from the figure, when tuned to the final desired properties of the CED 610, in this case, the audio enhancement system (AES) 500 levels out the frequency response of the CED 610, while further extending the bass range (e.g. lower frequency range) of the frequency response versus either responses shown in either of the other traces (e.g. compared to trace 620 and trace 625).

These improvements in the audio output 611 from the consumer electronics device 610 may be advantageous for improving user experience, increasing audio performance from the device (e.g. extending the dynamic range, increasing the available sound pressure level, extending the bass response thereof, etc.), decreasing part to part variability, improving manufacturing yields, and for standardizing audio performance (e.g. providing a consistent audio performance consistent with the target acoustic response) in applications that run on the consumer electronics device 610.

By using an optimization system 101, 201 in accordance with the present disclosure, to analyze the frequency response, impulse response, etc. of the consumer electronics device 610 an accurate and compensate able calculation of an acoustic signature for the consumer electronics device 610 may be made. Optimal compensating parameters 510 for an associated audio enhancement system 500 can be derived from the acoustic signature. In aspects, the acoustic signature may be compensated for in the audio enhancement system 500 to produce an enhanced audio output 611 from the CED 610 (e.g. so as to more closely match a target acoustic response). In aspects, the acoustic signature may also be used to derive one or more parameters 510 in the audio enhancement system 610 thus providing a means for compensating for the acoustic signature of the consumer electronics device 610.

The CED 10, 610 may include one or more audio sampling components (e.g. microphones, speakers with dual I/O functionality, etc.). The audio sampling component may be used as a form of feedback for assessing the audio performance of the CED 10, 610 in practice. In aspects, the audio enhancement system may include one or more reconfigurable parameters 510, which may be mildly adjusted in the field to compensate for various acoustic property changes (e.g. due to aging, dust buildup, etc.) that may occur throughout the lifetime of the device. Such AES adjustments may be implemented in a relatively robust fashion by using a combination of acoustic output from the system, audio capture from the audio sampling components, and implementation of a correction algorithm (e.g. on the device, in a cloud data center, as part of a virtualized and/or cloud based optimization system 101, 201, etc.).

Figure 7A:
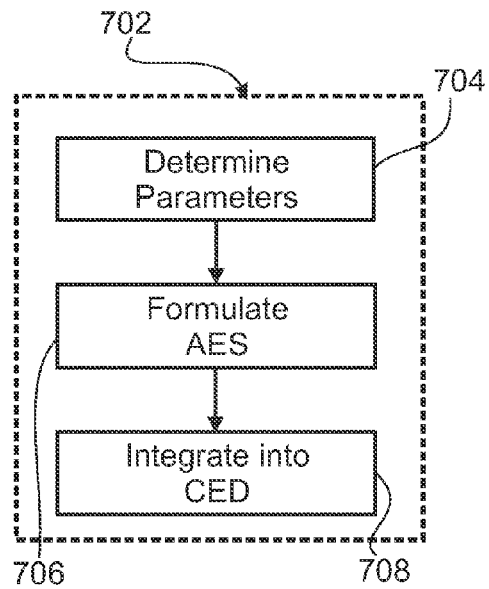
FIGS. 7a-b show methods for optimizing audio performance of a consumer electronics device in accordance with the present disclosure for use during a design phase and/or a manufacturing process of the consumer electronics device.
Figure 7B:
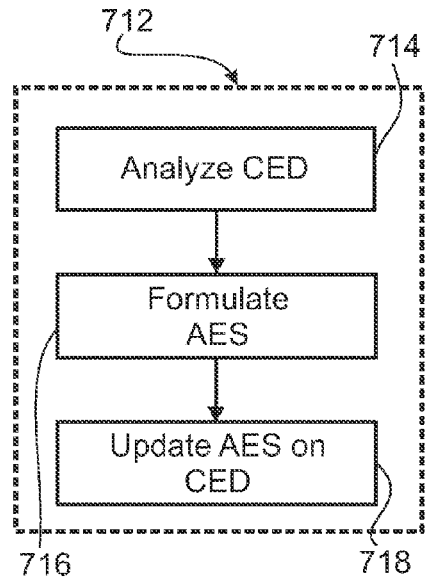

FIGS. 7*a-b* show methods for optimizing audio performance of a consumer electronics device including an audio enhancement system in accordance with the present disclosure for use during a design phase and/or a manufacturing phase of the consumer electronics device. The methods may be implemented by and/or in cooperation with an optimization system 101, 201 and/or a tuning rig 900 both in accordance with the present disclosure.

FIG. 7*a* shows a method 702 for enhancing audio performance of a consumer electronics device including an audio enhancement system 500 in accordance with the present disclosure. The method 702 includes determining a set of parameters 704 for a configurable audio processing system (e.g. an audio enhancement system 500), optimizing and/or formulating the audio processing system with the parameters 706, and integrating the optimized audio processing system into the consumer electronics device 708.

The parameters 510 may be determined and/or optimized by analyzing the consumer electronics device 10, 610 in an acoustic test chamber (e.g. an anechoic test chamber, a tuning rig 900 in accordance with the present disclosure, etc.) including one or more audio sensors, and running a configuration algorithm to pre-configure and/or determine the optimal parameters 510 for the configurable audio processing system in combination with the analysis. The parameters 510 may be iteratively determined through repetition of the analysis process. In aspects, the method may be implemented along with an optimization system 101, 201 in accordance with the present disclosure.

In aspects, a method for enhancing audio performance of a consumer electronics device (CED) 10, 610 may include placing the consumer electronics device 10, 610 including an audio signal source, one or more transducers, and an audio enhancement system (AES) into an acoustic test chamber with a plurality of audio sensors (e.g. microphones) spatially and optionally strategically arranged within the acoustic test chamber and/or on or within the CED 10, 610 (e.g. a microphone on a handset CED 610). A range of test audio signals (e.g. impulse signals, frequency sweeps, music clips, pseudorandom data streams, etc.) may be played on the consumer electronics device 610, monitored and recorded with the audio sensors and/or sensors on the consumer electronics device 610. In aspects of an initial test, the audio enhancement system 500 may substantially include an uncompensated distortion function (a null state whereby the audio enhancement system 500 is configured so as to not substantially affect the audio signal pathway through the CED 10, 610). The uncompensated distortion function may act to minimally affect the acoustic signature of the CED 10, 610 during the initial testing procedures.

The effect of the CED 10, 610 on the test audio signals may be measured by the audio sensors. The CED 10, 610 acoustic signature may be estimated from cross correlation and/or comparison of the test audio signals with the corresponding measured signals from the audio sensors. To further improve the estimation process, the acoustic signature of one or more elements in the acoustic test chamber may be estimated (i.e. one or more audio sensors, the mounting apparatus of the consumer electronics device, the effect of any test leads or cables on the consumer electronics device, etc.) and subsequently compensated for in the above analysis. Thus a more true representation of the acoustic signature as well as the acoustic responses of the CED 10, 610 to the full gamut of test audio signals may be obtained and consequently applied to the analysis.

The audio enhancement system 500 transfer functions may then be parametrically configured to compensate for the acoustic signature of the CED 10, 610. In aspects, one non-limiting approach for calculating the audio enhancement system transfer function(s) from the acoustic signature of the CED 10, 610 may be to implement a time domain inverse finite impulse response (FIR) filter based upon the estimated acoustic signature of the CED 10, 610. This may be implemented by performing one or more convolutions of the AES 500 transfer functions with the acoustic responses of the CED 10, 610 to the audio input signals. An averaging algorithm may be used to optimize the transfer function(s) of the AES 500 from the outputs measured across multiple sources and/or multiple test audio signals.

In one non-limiting example, the compensation transfer function may be calculated from a least squares (LS) time-domain filter design approach. If c(n) is the system response to be corrected (such as the output of an impulse response test) and a compensating filter is denoted as h(n), then one can construct C, the convolution matrix of c(n), as outlined in equation 1:

$$C = \begin{bmatrix} c(0) & & 0 \\ \vdots & \ddots & \vdots \\ c(N_o - 1) & \ddots & c(0) \\ \vdots & \ddots & \vdots \\ 0 & & c(N_o - 1) \end{bmatrix} \quad \text{[equation 1]}$$

where $N_c$ is the length of the response c(n). C has a number of columns equal to the length of h(n) with which the response is being convoluted. Assuming the sequence h has length denoted by $N_h$, then the number of rows of C is equal to $(N_h + N_c - 1)$. Then, using a deterministic least squares (LS) approach to compare against a desired response, (in a non-limiting example, defined as the Kronecker delta function δ(n-m)), one can express the LS optimal inverse filter as outlined in equation 2:

$$h(n) = (C^T C)^{-1} C^T a_m \quad \text{[equation 2]}$$

where $a_m(n)$ is a column vector of zeroes with 1 in the m th position to create the modeling delay. The compensation filter h(n) can then be computed from equation 2 using a range of computational methods.

As an alternative to the Kronecker delta function, more achievable target acoustic responses may be employed in the tuning process. In one non-limiting example, the target acoustic response may be calculated from a relatively flat and broad frequency response (e.g. a wide pass band signal). The target acoustic response may be converted into a time equivalent impulse response, which may form the target acoustic response employed in a tuning process with an optimization system 101, 201 in accordance with the present disclosure.

In another non-limiting example, the parametrically configurable transfer function(s) of the AES 500 may be iteratively determined by subsequently running test audio signals on the CED 10, 610 with the updated transfer function(s) and monitoring the modified acoustic signature of the CED 10, 610 with the audio sensors. A least squares optimization algorithm may be implemented to iteratively update the transfer function(s) between test regiments until an optimal modified acoustic signature of the CED 10, 11, 610 is obtained. Other, non-limiting examples of optimization techniques include non-linear least squares, L2 norm, averaged one-dependence estimators (AODE), Kalman filters, Markov models, back propagation artificial neural networks, Bayesian networks, basis functions, support vector machines, k-nearest neighbors algorithms, case-based reasoning, decision trees, Gaussian process regression, information fuzzy networks, regression analysis, self-organizing maps, logistic regression, time series models such as autoregression models, moving average models, autoregressive integrated moving average models, classification and regression trees, multivariate adaptive regression splines, and the like. Such algorithms may be implemented in an optimization system 101, 201 in accordance with the present disclosure.

Due to the spatial nature of the acoustic signature of a CED 10, 11, 610 the optimization process may be configured so as to minimize error between an ideal system response and the actual system response as measured at several locations within the sound field of the CED 10, 11, 610. The multi-channel data obtained via the audio sensors may be analyzed using sensor fusion approaches. In many practical applications, the usage case of the CED 10, 11, 610 may be reasonably well defined (e.g. the location of the user with respect to the device, the placement of the device in an environment, etc.) and thus a suitable spatial weighting scheme can be devised in order to prioritize the audio response of the CED 10, 11, 610 in certain regions of the sound field that correspond to the desired usage scenario. In one, non-limiting example, the acoustic response within the forward facing visual range of a laptop screen may be favored over the acoustic response as measured behind the laptop screen during such tests. In this way, a more optimal acoustic enhancement system 500 may be formulated to suit a particular usage case for the CED 10, 11, 610.

FIG. 7b shows a non-limiting example of a method 712 for enhancing audio in a consumer electronics device. The method 712 includes integrating a configurable audio enhancement system into a consumer electronics device 714, testing the consumer electronics device during the manufacturing, validation or final testing process 716, and updating the audio enhancement system within the consumer electronics device 718.

The consumer electronics device may be tested 716 in an automated optimization system 101 in accordance with the present disclosure. The optimization system 101 may run a diagnostic test on the consumer electronics device 10, 610 and record audio output from the device 10, 610 obtained during the diagnostic test. An update to the audio enhancement system 500 may be generated using data obtained from the diagnostic test, and the automated test cell may update the audio enhancement system 500 on the consumer electronics device 10, 610.

The method 712 may include hardcoding the optimized audio processing system into a hardware descriptive language (HDL) implementation. An HDL implementation may be advantageous for simplifying integration of the audio processing and enhancement system into existing processors and/or hardware on the consumer electronics device. An HDL implementation may also be advantageous for encrypting and protecting the parameters 510 in the audio processing system (e.g. an audio enhancement system 500 in accordance with the present disclosure).

Alternatively, additionally, or in combination, the method 712 may include soft-coding the optimized audio processing system and/or associated parameters 510 into a processor, flash, EEPROM, memory location, or the like. Such a configuration may be used to implement the AES in software, as a hardcoded routine on a DSP, a processor, and ASIC, etc.

Figure 8:
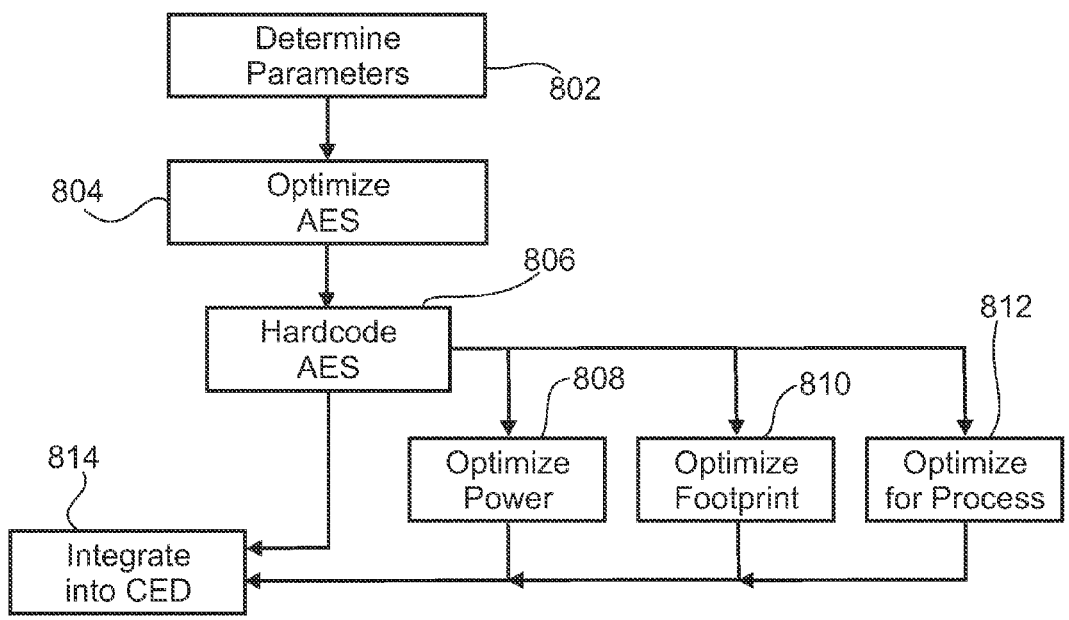
FIG. 8 shows a method for optimizing audio performance of a consumer electronics device including an integrated loudspeaker system and an audio enhancement system in accordance with the present disclosure.

FIG. 8 shows a non-limiting example of a method for integrating an audio enhancement system (AES) and an integrated loudspeaker assembly both in accordance with the present disclosure into a consumer electronics device. The method includes determining one or more parameters 510 for use in the audio enhancement system 802, optimizing the audio enhancement system 804, hard coding the audio enhancement system 806 into a hardware descriptive language (HDL) implementation, and integrating the audio enhancement system into a consumer electronics device 814. The method may include a step of optimizing the power usage of the AES 808, optimizing the footprint of the AES 810, and/or optimizing the hardcoded implementation for a given semiconductor fabrication process 812.

The step of determining one or more parameters for use in the audio enhancement system 802 may be first performed during the design stage of the associated consumer electronics device (e.g. as part of or to build an optimization system 101, 201, etc.). During this first step, the consumer electronics device with an audio enhancement system in accordance with the present disclosure, may be tested and analyzed in an audio test facility. The results of the testing may be used to construct an optimal set of parameters 510 for use with the associated AES 500 to compensate for acoustic anomalies, and deficiencies in the CED. The AES 500 may be tuned with the parameters 510 and the system may be iteratively tested and corrected as part of the parameter determination process 802.

The step of optimizing the AES 804 may be performed and/or updated during the final manufacturing and/or programming steps of the CED. Such a step may be performed using an optimization system 101, 201 in accordance with the present disclosure.

The method may include optimizing the HDL implementation for reduced power 808, reduced footprint 810, or for integration into a particular semiconductor manufacturing process (e.g. 13 nm-0.5 μm CMOS, CMOS-Opto, HV-CMOS, SiGe BiCMOS, etc.) 812. This may be advantageous for providing an enhanced audio experience for a consumer electronics device without significantly impacting power consumption or adding significant hardware or cost to an already constrained device.

Figure 9:
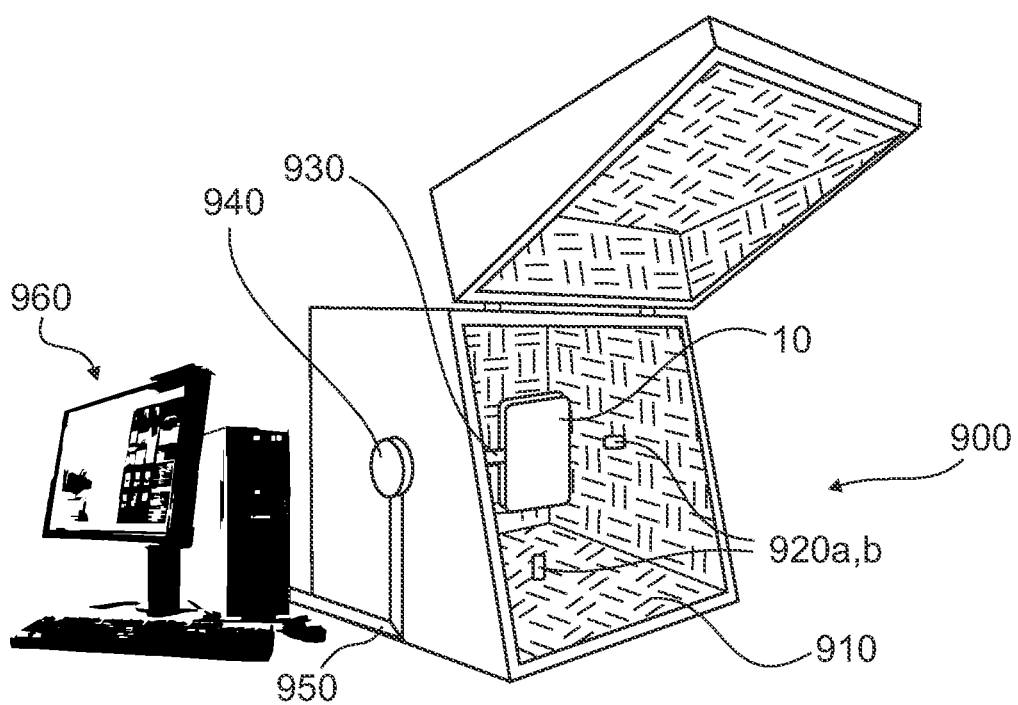
FIG. 9 shows a tuning rig for testing, validating, programming, and/or updating an audio enhancement system within a consumer electronics device in accordance with the present disclosure.

FIG. 9 shows aspects of a tuning rig 900 for testing, validating, programming, and/or updating an audio enhancement system 500 within a consumer electronics device (CED) 10 in accordance with the present disclosure. The tuning rig 900 may include an acoustic test chamber 910 (e.g. an anechoic chamber, semi-anechoic chamber, etc.) or alternatively a chamber with an improved acoustic quality (e.g. reduced echo, reduced influence from external sound sources, etc. compared to a manufacturing environment) in which to place a CED 10, 11, 610 for testing. The tuning rig 900 may include and/or interface with an optimization system 101, 201 in accordance with the present disclosure to perform the tuning and/or optimization process.

In aspects, the tuning rig 900 may include one or more microphones 920a,b spaced within the acoustic test chamber 910 so as to operably obtain acoustic signals emitted from the CED 10 during a testing and optimization procedure. The tuning rig 900 may include a boom 930 for supporting the CED 10. The boom 930 may include a connector for communicating with the CED 10 during a testing and optimization procedure (e.g. so as to send audio data streams to the CED 10 for testing, to program audio parameters on the CED 10, etc.). The boom 930 may be connected to a mounting arm 940 on the wall of the acoustic test chamber 910. The mounting arm 940 may include a rotary mechanism for rotating the CED 10 about the boom axis during a testing and optimization procedure. The mounting arm 940 may be electrically interconnected with a workstation 960 such as via cabling 950.

A workstation 960 is shown in the form of a computer workstation. Alternatively or in combination, the workstation 960 may include or be configured as a customized hardware system. The hardware configuration of the workstation 960 may include a data collection front end, a hardware analysis block (e.g. part of an optimization system 101, 201), and a programmer. Such a configuration may be advantageous for rapid, autonomous optimization of audio output from and/or audio signal processing aspects of the CED 10, 11, 610 during manufacturing. The workstation 960 may include at least a portion of an optimization system 101 in accordance with the present disclosure.

In aspects, the workstation 960 may have support for user input and/or output, for example to observe the programming processes, to observe the differences between batch programming results, for controlling the testing process, visualizing the design specification, etc. Alternatively or in combination, the workstation 960 may communicate audio test data and/or programming results to a cloud based data center. The cloud based data center may be configured to accept audio test data, to compare with prior programming histories and/or the master design record/specification, and to generate audio programming information to be sent to the CED 10. The cloud based data center may include an optimization system 101, 201 in accordance with the present disclosure.

The workstation 960 and/or cloud based data center may be configured to communicate relevant audio streaming and program data with the CED 10 wirelessly.

In aspects, the tuning rig 900 may be provided in a retail store or repair center to optimize audio performance of a CED 10, 610 including an audio enhancement system in accordance with the present disclosure. In aspects, a fee for service implementation of a tuning rig 900 may be used in a retail store in order to optimize the audio performance of a customer's CED, perhaps after selection of a new case for their CED, at the time of purchase, during a service session, during repair, during first boot, or the like. Such systems may provide the discerning consumer with the option to upgrade the audio performance of their device and allow a retail center to offer a unique experience enhancing service for their consumers.

It will be appreciated that additional advantages and modifications will readily occur to those skilled in the art. Therefore, the disclosures presented herein and broader aspects thereof are not limited to the specific details and representative embodiments shown and described herein. Accordingly, many modifications, equivalents, and improvements may be included without departing from the spirit or scope of the general inventive concept as defined by the appended claims and their equivalents.

What is claimed is:

1. A system for optimizing audio performance of a consumer electronics device comprising:
    an audio testing component for deriving an audio test dataset of a plurality of audio test datasets from the consumer electronics device;
    a master design record for outputting a reference dataset, wherein the master design record comprises at least a portion of a history of the audio test datasets and associated optimal audio parameters;
    an audio parameter generator comprising a probabilistic model for deriving one or more optimal audio parameters based on a comparison between the audio test dataset and the reference dataset;
    a machine learning algorithm for training the probabilistic model; and
    a programming unit to program the optimal audio parameters onto the consumer electronics device.

2. The system in accordance with claim 1, wherein the probabilistic model is selected from a group consisting of a Kalman filter, a Markov model, a neural network, a Bayesian network, a fuzzy network, a self-organizing map, a dynamic Bayesian network and combinations thereof.

3. The system in accordance with claim 1, further comprising an acoustic analysis unit for generating a relative dataset from the reference dataset and the audio test dataset, the audio parameter generator configured to accept the relative dataset for use in generating the optimal audio parameters.

4. The system in accordance with claim 3, wherein the acoustic analysis unit comprises a feature extraction block to derive one or more audio features from the audio test dataset and/or the reference dataset, the audio features included in the relative dataset.

5. The system in accordance with claim 3, wherein the acoustic analysis unit comprises a variance analysis block to derive an audio variance dataset from the audio test dataset and the reference dataset, the audio variance dataset included in the relative dataset.

6. The system in accordance with claim 1, further comprising a manual parameter building interface comprising a display and a data input device for interfacing with a human user.

7. The system in accordance with claim 6, wherein the manual parameter building interface comprises a toolset to allow a human user to generate the optimal audio parameters, bypassing the audio parameter generator.

8. A tuning rig for optimizing acoustic performance of a consumer electronics device configured to accept one or more programmable audio parameters, comprising:
    an acoustic test chamber configured to accept the consumer electronics device;
    one or more microphones placed within the acoustic test chamber; and
    a workstation in operable communication with the consumer electronics device and the one or more microphones, configured to deliver one or more audio test signals to the consumer electronics device, receive one or more measured signals from the one or more microphones and/or the consumer electronics device, and to program at least a portion of the one or more programmable audio parameters,
    wherein the workstation comprises:
        an audio testing component for deriving an audio test dataset of a plurality of audio test datasets from the consumer electronics device;
        a master design record for outputting a reference dataset, wherein the master design record comprises at least a portion of a history of the audio test datasets and associated optimal audio parameters;
        an audio parameter generator for comprising a probabilistic model for deriving one or more optimal audio parameters based on a comparison between the audio test dataset and the reference dataset; a machine learning algorithm for training the probabilistic model; and
        a programming unit to program the optimal audio parameters onto the consumer electronics device.

9. The tuning rig in accordance with claim 8, wherein the workstation comprises and/or is configured to communicate with a master design record, the master design record configured to output a reference dataset, at least a portion of the one or more programmable audio parameters depending on the reference dataset.

10. The tuning rig in accordance with claim 9, wherein the workstation is configured to communicate one or more of the audio test signals, one or more measured signals, and/or identification information pertaining to the consumer electronics device to a cloud based data center.

11. The tuning rig in accordance with claim 8, wherein the workstation is configured to receive one or more audio enhancement parameters from a cloud based data center and to program the consumer electronics device with the audio enhancement parameters.

12. The tuning rig in accordance with claim 8, wherein the workstation comprises software for calculating one or more optimal audio parameters from the audio test signals and the measured signals, and for programming the optimal audio parameters onto the consumer electronics device.

13. The tuning rig in accordance with claim 8, wherein the acoustic test chamber is an anechoic chamber or semi-anechoic chamber.

14. A method for tuning audio performance of a consumer electronics device comprising:
    forming a master design record for the consumer electronics device comprising a reference audio parameter set and a reference audio test dataset, wherein the master design record includes at least a portion of a history of a plurality of audio test datasets and associated optimal audio parameters;
    uploading the reference audio parameter set to the consumer electronics device;
    performing an audio test on the consumer electronics device to form a test dataset of the plurality of audio test datasets;
    using a probabilistic model for deriving a tuned audio parameter set based on a comparison between the reference audio test data and the test dataset;
    training the probabilistic model via a machine learning algorithm; and
    uploading the tuned audio parameter set to the consumer electronics device.

15. The method in accordance with claim 14, wherein the step of using is completed with a system for optimizing audio performance of a consumer electronics device, the system comprising:
    an audio testing component for deriving an audio test dataset from the consumer electronics device;
    a master design record for outputting a reference dataset;
    an audio parameter generator for deriving one or more optimal audio parameters from the audio test dataset and the reference dataset; and
    a programming unit to program the optimal audio parameters onto the consumer electronics device.

16. The method in accordance with claim 14, wherein the step of performing is completed with a tuning rig for optimizing acoustic performance of a consumer electronics device configured to accept one or more programmable audio parameters, the tuning rig comprising:
    an acoustic test chamber configured to accept the consumer electronics device;
    one or more microphones placed within the acoustic test chamber; and
    a workstation in operable communication with the consumer electronics device and the one or more microphones, configured to deliver one or more audio test signals to the consumer electronics device, receive one or more measured signals from the one or more microphones and/or the consumer electronics device, and to program at least a portion of the one or more programmable audio parameters.

* * * * *